Figure 1:
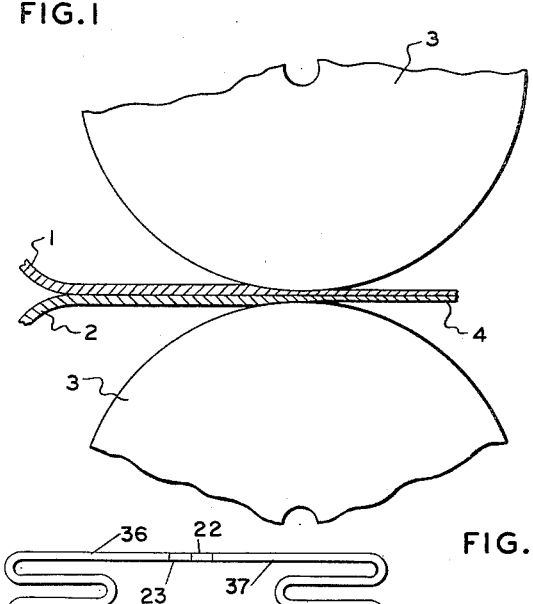

July 3, 1962 — E. G. GARDINER — 3,042,428
COPPER-ALUMINUM TUBULAR CONNECTOR
Filed April 5, 1954

INVENTOR.
EMMETT G. GARDINER
BY
HIS ATTORNEY

United States Patent Office 3,042,428
Patented July 3, 1962

3,042,428
COPPER-ALUMINUM TUBULAR CONNECTOR
Emmett G. Gardiner, Erie, Pa., assignor to General
Electric Company, a corporation of New York
Filed Apr. 5, 1954, Ser. No. 420,895
4 Claims. (Cl. 285—173)

The present invention relates to a copper-aluminum tubular connector and to a method of making such connectors. More particularly it is concerned with a tubular connector having one end portion composed of copper and the other of aluminum, the two portions being pressure bonded together to form a strong, leak-proof joint having a relatively large bonded area.

In the manufacture of closed, pressure-tight refrigeration systems including an aluminum evaporator and a copper condenser, it is necessary to join the aluminum tubing forming part of the evaporator structure to the copper tubing forming part of the condenser structure in such a manner that strong leak-proof joints can be consistently obtained.

While aluminum can be bonded to aluminum or copper to copper by any one of a number of methods such as soldering, brazing or the like to form joints which are leak-proof and strong, frequently stronger than the material being joined, known methods of soldering or brazing an aluminum surface to a copper surface have not been completely satisfactory. When low melting point solders are employed, the aluminum first has to be tinned by a complicated and expensive process which includes the application to the aluminum surface of a film of copper or the like which can be wet by the solder. In addition the resultant soldered joints are not acceptable for example for use in refrigeration circuits where the humidity and other ambient conditions cause the soft solders to deteriorate and become brittle with time resulting in a loosening of the joint. The brazing of aluminum to copper to form a leak-proof joint is a difficult operation both because of the substantial difference in the coefficients of expansion of the two metals and the fact that the interface alloys formed or used during the brazing operation are quite brittle so that the resultant joints are mechanically weak.

While various mechanical methods are available for joining aluminum and copper tubing, such mechanical connections are not desirable for example in a sealed system such as a refrigeration system where all joints must remain leak proof for long periods of time, or in other words for the life of the refrigerator.

One method presently used for joining the aluminum tubing comprising part of the evaporator portion of the refrigeration system and the copper tubing forming part of the condenser structure involves the use of a connector obtained by butt welding an aluminum tube to a copper tube by a resistance welding process which comprises bringing the ends of the tubes together under substantial pressure and passing a current through the joint to heat the metals above the flow point of the aluminum. A relatively heavy pressure on the joint area is necessary and both the temperature and pressure conditions are critical in order to obtain a welding action and at the same time squeeze out from the joint area all or substantially all of the aluminum-copper alloy formed during the heating operation. Otherwise this brittle alloy would result in an extremely weak joint which in the majority of cases would not be leak-proof. In actual practice lengths of aluminum and copper tubing are mounted in suitable resistance welding equipments and the ends of the tubes brought into engagement under heavy pressure after which a resistance welding current is passed through the two members to bring the aluminum and copper up to a bonding temperature. By continuously applying pressure during the welding operation a substantial amount of the brittle aluminum copper alloy is squeezed out of the joint. The resultant tubular connector is then employed in joining the aluminum evaporator with the copper condenser by seals which include and aluminum-aluminum seal and a copper-copper seal made by any of the usual brazing techniques known to be satisfactory for making such joints. However, while every effort is made to free the joint between the aluminum and copper of all of the brittle aluminum-copper interface alloy, the shop rejections on such connectors are extremely high. Even though only joints passing a water immersion leak-proof test are used in final assembly of the refrigeration system, many of these joints develop leaks as a result of bending stresses set up during assembly or deterioration due to the heat transmitted to the aluminum-copper when the connector is brazed to the aluminum and copper tubes.

Thus it will be seen that whether an aluminum-copper joint is made by the brazing method or by resistance welding techniques the aluminum-copper interface alloy obtained whenever the metals to be joined are heated above the flow point of the aluminum either during the formation of the joint or subsequently presents a problem. It is therefore a principal object of my invention to provide a tubular aluminum-copper connector comprising an aluminum-copper joint free or substantially free of the brittle aluminum-copper interface alloy.

Another object of the invention is to provide an aluminum-copper joint which will not deteriorate when subjected to a moderate amount of heating as for example when the ends of the connector are heated to brazing temperatures during the use thereof in joining an aluminum tube to the aluminum end or a copper tube to the copper end.

Further objects and advantages of the invention will become apparent as the following description proceeds and the features of novelty which characterize the invention will be pointed out with particularity in the claims annexed to and forming part of this specification.

In carrying out the objects of the present invention, there is provided a tubular connector including a copper section and an aluminum section joined by an intermediate section comprising overlapping pressure bonded portions of the copper and aluminum sections, the bonded area being substantially free of the alloys of the respective metals formed at temperatures approaching the flow point of aluminum. In order to provide a connector of this type in which the copper and aluminum sections are pressure bonded together, a pressure bonded bimetal sheet of aluminum and copper is drawn in a series of drawing operations into the form of a tubular element comprising an outer layer of one of the metals and an inner layer of the other. Thereafter the outer metal layer is removed from one of the tubular elements and the inner metal layer from the other leaving a mid section comprising overlapping layers of the two metals pressure bonded together.

Figure 2:
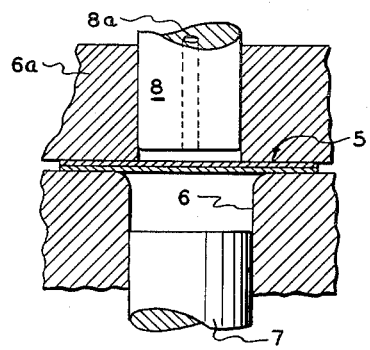
Figure 3:
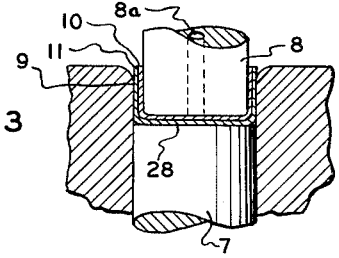
Figure 9:
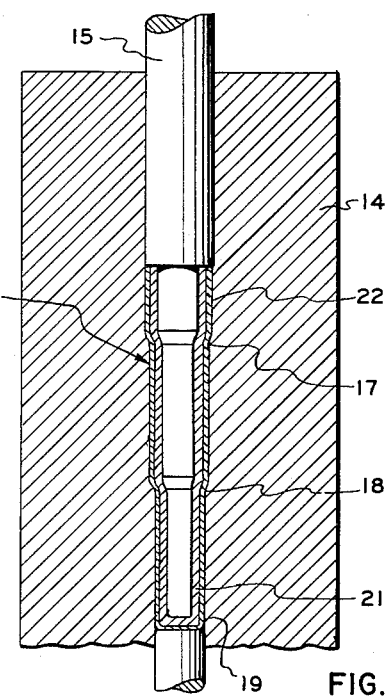
Figure 4:
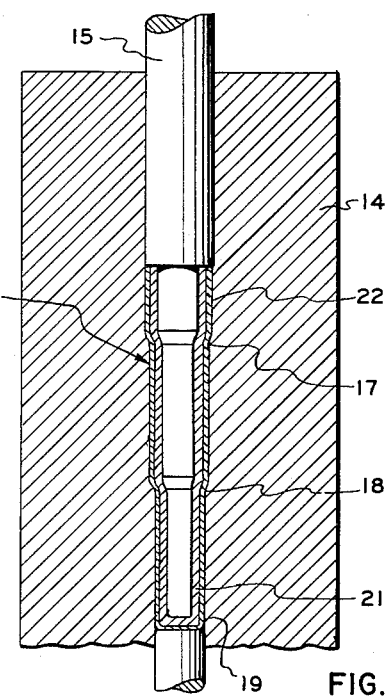
Figure 5:
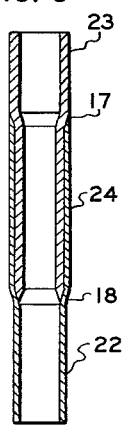
Figure 6:
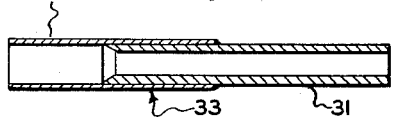

For a better understanding of the invention reference may be had to the accompanying drawings in which
FIG. 1 is a view illustrating one manner in which the bimetal sheet material is produced;
FIGS. 2 to 4 inclusive illustrate operations representative of the series of operations required to convert a blank of the bimetal sheet into the desired tubular shape;
FIG. 5 illustrates a preferred form of the tubular connector of the present invention;
FIG. 6 illustrates another form of the present invention; and
FIGS. 7 and 8 respectively illustrate enlarged cross-sectional views of the interfacial bonds between the aluminum copper in sheet form and in the final tubular form, and FIGURE 9 illustrates schematically a refrigerating system embodying the present invention.

In order to obtain a satisfactory bond between the aluminum and copper without the use of any intermediate brazing or soldering material and without raising the temperatures to the flow point of the lower melting aluminum component it is necessary to subject the superimposed layers of copper and aluminum to pressures sufficient to displace any aluminum oxide present on the surface of the aluminum. The necessary bonding pressures and the displacement of the aluminum oxide is preferably obtained by the process illustrated in FIG. 1 in which the previously cleaned aluminum sheet 1 and copper sheet 2 are brought together and passed through one or more sets of rolls 3 which exert a line contact pressure on the superimposed sheets sufficient to displace any aluminum oxide on the cleaned aluminum sheet 1 and to produce a substantial reduction in the thickness of both sheet materials due to the heavy rolling pressures involved. While the temperature of the rolled sheets may rise during the rolling operation it does not approach or more specifically does not equal the flow point temperature of the aluminum so that the bond obtained between the aluminum and copper components of the bimetal sheet 4 issuing from the rolls 3 is distinctly a pressure bond substantially free of any of the aluminum copper alloys such as are obtained when the aluminum is heated to its flow point. The resultant pressure bond obtained by this technique is equal to the tensile strength of the aluminum and thus is far superior to the brittle joints obtained by the usual soldering or brazing methods involving temperatures sufficiently high to form the brittle intermediate alloys.

Employing the pressure bonded aluminum-copper bimetal sheet suitable blanks of the bimetal sheet are subjected to a series of drawing operations some of which are illustrated in FIGS. 2 to 4 of the drawing. With reference to FIG. 2 there is shown a blank 5 of the aluminum-copper bimetal sheet held in position over a die 6 by a holding or locating ring 6a. The die 6 includes a knockout pin 7, and the die 6 and cooperating punch 8 having a vent hole 8a, are of such shape that when the punch 8 is lowered into the cavity of the die 6 the blank 5 is drawn into the form of a cup as shown specifically in FIG. 3 of the drawing. Due to the fact that the aluminum is considerably softer than the copper there is some thickening of the aluminum layer during each draw. Thus the circumferential aluminum layer 10 comprising the cup 9 is somewhat thicker than in the original blank 5 while the copper layer 11 is of about the same thickness as in the original blank. Thereafter employing a series of dies of the same general shape as that shown in FIGS. 2 and 3 with each succeeding die and punch having a size and shape such that the cup 9 formed in each successive operation has a smaller diameter and a greater depth than in the previous operation there is eventually obtained a tubular structure closed at one end and having a length substantially greater than its diameter. Preferably during the final drawing operations there are employed cooperating dies 14 and punches 15 (FIG. 3) of such a shape that the drawn bimetal article 16 has one or more sloping shoulder portions 17 and 18 as shown in FIG. 4. After the final drawing operation as illustrated in FIG. 4 the lower end 19 of the cup 16 is removed either by piercing or by cutting off the lower end after which the aluminum layer 21 forming the inner metal layer adjacent the bottom of the cup is reamed away to expose the inner surface of the copper layer 22 up to approximately the shoulder 18 while the outer copper layer 22 adjacent the upper end of the cup 16 is machined away to expose the underlying aluminum layer between shoulder 17 and the adjacent end. The final product after these reaming and machining operations is shown in FIG. 5. This tubular connector comprises a copper end portion 22 connected to an aluminum end portion 23 by an intermediate portion or section 24 comprising overlapping layers comprising an inner layer of aluminum and an outer layer of copper pressure-bonded together. With reference to FIG. 5 it will be noted that in the final product the aluminum layer or portion 23 has a thickness approximately twice that in the original bimetal sheet 4 while the copper section has approximately the same thickness as in the original bimetal blank 5.

Figures 7, 8:
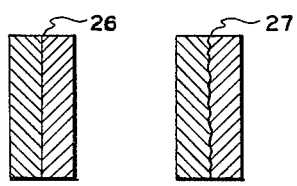

During the drawing operations, the bond between the copper and aluminum layers is further enhanced as is indicated by differences between the interface between the two metal layers subsequent to the rolling operation and after the final drawing operation. The interface 26 after the final rolling operation illustrated in FIG. 1 is approximately a straight line as shown in FIG. 7. On the other hand after the final drawing operation the interface indicated by numeral 27 is quite irregular clearly indicating that the harder copper material has imbedded itself in the adjacent aluminum surface to form a stronger bond with the aluminum than that obtained only by the rolling operations.

Since during drawing, the aluminum and the copper strain harden it is preferable to form the tubular connector with a plurality of shoulders as shown in FIGS. 4 and 5 since by this method the portions of the connector forming the lower sections of the cup member 16 are primarily to a large extent from the material forming the bottom portion 28 of the original cup shown in FIG. 3 which received the least amount of work during the first few drawing steps. Thus the amount of work hardening for the various portions of the final connector is more uniform over its entire length than would be the case if the die and punch shapes were not gradually changed to provide the shouldered element. However where work hardening is not an essential factor, it is also within the scope of the present invention to provide a tubular element drawn directly to a tubular shape with no shoulder portions such as shown in FIG. 6 in which the copper layer has been machined away from one end of the tube to leave an aluminum section 31 and the aluminum reamed from the other end of the tube to leave a copper section 32, these two sections being joined by the intermediate section 33 in which the aluminum and copper are pressure bonded together over a substantial area much larger than that obtained for example by butt welding.

The resultant connectors are employed in the same manner as the butt welded connector described hereinbefore. For example in the manufacture of a refrigeration unit illustrated in FIG. 9, the aluminum end 23 of the connector is suitably brazed with the usual aluminum brazing materials to the aluminum tubing 36 forming part of the evaporator structure while the copper end section 22 is copper or silver brazed to the copper tubing 37 forming part of the condenser structure.

It has been found that the connectors of the present invention in which the aluminum copper portions are pressure bonded together over an area much larger than that present for example in the previously employed butt welded connectors are exceptionally leak proof. Furthermore the pressure bonded joint resists to a much greater degree any bending stresses or heating involved in manufacturing assembly and the brazing of the copper-copper and aluminum-aluminum joints involving the respective copper and aluminum end sections of the connector. In addition, because of the high number of rejects in the case of the butt welded connectors, the actual cost of connectors prepared in accordance with the present invention is about half that of a butt welded connector.

While there has been shown and described specific

What I claim as new and desire to secure by Letters Patent of the United States is:

1. In a refrigeration system, a fluid conducting part formed of aluminum tubing and another fluid conducting part formed of tubing of a metal that can readily be soldered, a tubular fluid conducting transition piece connecting said tubing in fluid flow relationship and formed of a tubular layer of aluminum and a tubular layer of a readily solderable metal, a pressure tight joint integrally uniting the readily solderable tubular metal part of the transition piece and the tubing of the readily solderable metal, and a pressure tight joint integrally uniting the tubular aluminum of said transition piece and said aluminum tubing, said transition piece being formed of dissimilar wrought metals, metallurgically bonded together at their interface.

2. A system according to claim 1 wherein said readily solderable metal of said transition piece is copper.

3. A refrigeration system including a fluid conducting part formed of aluminum tubing and another fluid conducting part formed of tubing of a metal that can readily be soldered, a tubular fluid conducting transition piece connecting said tubing in fluid flow relationship and formed of bimetal consisting of a tubular layer of aluminum and a tubular layer of copper bonded to one face of said layer of aluminum, a soldered pressure tight joint integrally uniting the copper of said transition piece and said other part, and a welded pressure tight joint between the aluminum of said transition piece and said aluminum tubing, each of said layers of said transition piece being of sufficient wall thickness to contain the internal pressure to which the fluid of the system is subjected within said transition piece.

4. In the art of manufacturing refrigerating systems wherein a fluid conducting part is aluminum tubing and another part is tubing of a readily solderable metal, that method of forming a fluid pressure tight fluid flow connection between said tubing which consists of forming a bimetal tube consisting of a tubular layer of aluminum and a tubular layer of a readily solderable metal and wherein each of said layers is of sufficient wall thickness to contain the internal pressure to which the fluid of said system is subjected within said bimetal tube, integrally uniting said layer of aluminum to said aluminum tubing and integrally uniting said layer of readily solderable metal the tubing formed of readily solderable metal, said bimetal tubing being formed of dissimilar wrought metals metallurgically bonded together at their interface.

References Cited in the file of this patent

UNITED STATES PATENTS

| | | |
|---|---|---|
| 432,496 | Smith | July 15, 1890 |
| 542,548 | Nelson | July 9, 1895 |
| 731,100 | Dick | June 16, 1903 |
| 1,011,744 | Clamens | Dec. 12, 1911 |
| 1,054,669 | Bowen | Mar. 4, 1913 |
| 1,667,787 | Jaeger et al. | May 1, 1928 |
| 1,776,615 | Boothman | Sept. 23, 1930 |
| 2,086,857 | Derby | July 13, 1937 |
| 2,490,548 | Schultz | Dec. 9, 1949 |
| 2,513,365 | Rogoff | July 4, 1950 |
| 2,522,408 | Sowter | Sept. 12, 1950 |
| 2,787,481 | Buschow | Apr. 2, 1957 |

FOREIGN PATENTS

| | | |
|---|---|---|
| 854,005 | Germany | Oct. 30, 1952 |
| 729,851 | Great Britain | May 11, 1955 |

Dedication 3,042,428.—*Emmett G. Gardiner*, Erie, Pa. Copper-Aluminum Tubular Connector. Patent dated July 3, 1962. Dedication filed Oct. 22, 1962, by the assignee, *General Electric Company*.

Hereby dedicates to the public the entire term of said patent.
[*Official Gazette November 27, 1962.*]